United States Patent [19]

Pcolinsky

[11] Patent Number: 5,482,980
[45] Date of Patent: Jan. 9, 1996

US005482980A

[54] METHODS FOR PREPARING FLEXIBLE, OPEN-CELLED, POLYESTER AND POLYETHER URETHANE FOAMS AND FOAMS PREPARED THEREBY

[75] Inventor: Michael P. Pcolinsky, Hazleton, Pa.

[73] Assignee: PMC, Inc., Sun Valley, Calif.

[21] Appl. No.: 275,122

[22] Filed: Jul. 14, 1994

[51] Int. Cl.$^6$ .................................................. C08J 9/36
[52] U.S. Cl. ........................ 521/130; 521/114; 521/918
[58] Field of Search ..................................... 521/114, 918, 521/130

[56] References Cited

U.S. PATENT DOCUMENTS

| | | |
|---|---|---|
| 3,227,666 | 1/1966 | Showalter et al. . |
| 3,640,829 | 2/1972 | Elton . |
| 3,644,229 | 2/1972 | Butler et al. . |
| 3,748,288 | 7/1973 | Winkler et al. . |
| 3,770,537 | 11/1973 | Elton . |
| 3,884,848 | 5/1975 | Ricciardi et al. . |
| 4,021,379 | 5/1977 | Chaya et al. . |
| 4,032,481 | 6/1977 | Pillar . |
| 4,287,307 | 9/1981 | Hostettler . |
| 4,376,833 | 3/1983 | Ferretti . |
| 4,383,050 | 5/1983 | Nissen et al. . |
| 4,775,558 | 10/1988 | Haas et al. . |
| 4,826,882 | 5/1989 | Bredbenner et al. . |
| 4,892,891 | 1/1990 | Close . |
| 5,135,961 | 8/1992 | Feske . |
| 5,229,428 | 7/1993 | Bayer . |

*Primary Examiner*—Morton Foelak
*Attorney, Agent, or Firm*—Leydig, Voit & Mayer, Ltd.

[57] ABSTRACT

A method for the preparation of a flexible, open-celled, urethane foam which comprises reacting at least one isocyanate and at least one polyol in the presence of at least one catalyst and an epoxidized soybean oil, wherein each polyol is a saturated polyether polyol. A further aspect of the present invention provides a pre-formation method for the preparation of a flexible, open-celled, urethane foam, the method comprising reacting at least one isocyanate and at least one polyol in the presence of at least one catalyst and about 7 phR to about 25 phR of an epoxidized soybean oil, wherein each polyol is a saturated polyester polydol. Flexible, open-celled urethane foams prepared in accordance with the methods set forth previously are also included in the present invention.

43 Claims, No Drawings

METHODS FOR PREPARING FLEXIBLE, OPEN-CELLED, POLYESTER AND POLYETHER URETHANE FOAMS AND FOAMS PREPARED THEREBY

TECHNICAL FIELD OF THE INVENTION

The present invention relates to methods for preparing flexible, open-celled, urethane foams, specifically polyester and polyether urethane foams, and foams prepared by those methods.

BACKGROUND OF THE INVENTION

Since their discovery in the 1930's, urethane foams have been used in a wide variety of applications. One example of such applications include their use as media for the filtration of gases and liquids. To be useful as filtration media, however, as well as for certain other applications, such foams must possess a relatively high level of permeability. As many urethane foams inherently possess a lower level of permeability than is desirable for such applications, those in the art have developed various methods to address this issue. These methods may be conveniently divided into two groups in accordance with the timing of their use, i.e., pre-formation methods and post-formation methods.

Post-formation methods of foam permeability enhancement are those methods which are used in connection with foams that have been fully-formed and cured. One well-known post-formation method is explosion reticulation. This method is suitable for use in regard to both polyester and polyether urethane foams, i.e., foams prepared by reacting isocyanate with a polyester polyol or a polyether polyol, respectively. A second such method, which has been typically used only in connection with polyester urethane foam, comprises immersing the fully-formed foam into a caustic bath which dissolves a certain portion of the foam, thereby increasing the permeability of the foam.

As the foregoing post formation processes can be used only after the foam is fully-formed those in the art turned to developing more efficient means of preparing highly permeable urethane foams. Eventually, methods were developed which provided such foams without requiring post-formation processing. These methods, which can be referred to as pre-formation methods, add certain components into specifically formulated foam-forming reaction compositions. Those components assist in generating the desired level of permeability in the resulting foam during its preparation, i.e., without requiring any post-formation treatment of the foam, and are according more efficient than post-formulation methods. Examples of pre-formulation methods are provided by U.S. Pat. Nos. 3,748,288, 3,884,848, and 4,826,882.

Despite the known advantages of pre-formation methods for preparing urethane foams, those in the art have been unable to prepare highly permeable urethane foams by any pre-formation method when only polyether polyols, or only polyester polyols, are used as the polyol component.

In particular, those skilled in that art have been unable to obtain a foam product when only polyester polyols are included in compositions used in existing pre-formation methods. Specifically, compositions containing only polyester polyols will typically destabilize and boil. Even in those situations where a rising foam mass is able to be formed, it will eventually destabilize and collapse.

In contrast, those skilled in the art have been able to prepare foams using compositions which include only polyether polyols. However, such foams exhibit low permeabilities, e.g., about 4 ft$^3$/min and below, as well as a limited range of densities, e.g., from about 0.75 to about 4 lb/ft$^3$. Foams having permeabilities below about 2 ft$^3$/min are generally considered to be unsuitable for use as filter elements in most applications.

One pre-formation method which is, in essence, a compromise solution to the problems inherent in the polyester- and polyether-only compositions described previously, is Velve® foam. (General Foam Corporation, West Hazleton, Pa). This urethane foam is prepared from a complex composition which necessarily includes, inter alia, a combination of polyester and polyether polyols. In addition to that combination of polyols, emulsifiers must also be included in the composition. Emulsifiers, which are typically included in foam-forming compositions, function to stabilize the composition as the foam-forming reaction proceeds, i.e., prevent the composition from boiling and/or collapsing. Selection of the type of emulsifier generally depends upon the type of polyol that is predominant in the composition. The Velve® foam composition is unusual in that respect because, as a composition which includes a polyester-type polyol as its predominant polyol component, it uses a silicone-based emulsifier that is typically used in compositions having polyether type polyols.

The increase in stability provided by such emulsifiers, however, also yields a less permeable foam product. To counteract the decrease in permeability attendant with the addition of an emulsifier, cell-opening agents are included in the composition. The end result is a foam-forming composition which achieves a tenuous balance between adequate permeability in the final foam product and stability of the composition during preparation.

Preparing a foam using the Velve® foam composition, however, is a very difficult procedure. In order to obtain the desired high degree of permeability, the process must be operated such that the foam composition, while rising, is continually on the verge of collapsing. Thus, in the preparation of a highly permeable foam using this known method, one is faced with the problem of controlling a very unstable and complicated process.

The method for preparing the Velve® foam product is further limited in regard to the type of foam that can be obtained. More specifically, foams prepared by this method are primarily relatively soft foams, making these foams unsuitable for certain applications which require relatively firm foams. In addition, any substantial deviation from the Velve® foam formulation, e.g., eliminating one of the polyols completely such that only a polyether polyol (or only a polyester polyol) is used, or significantly altering the quantities of the various components, typically results in either collapse of the rising foam composition or, if a foam is ultimately produced, an unusable product.

Further, due to its inclusion of primarily polyester polyols in its formulation, the Velve® foam method provides urethane foams which are useful for applications where the foam is to be exposed to organic solvents. However, this type of urethane foam would not be suitable in applications where the foam will experience high levels of heat and humidity.

Accordingly, it is an object of the present invention to provide a method for preparing a flexible, and permeable, urethane polyester foam in which the tendency for the foam to collapse during preparation is minimized, without sacrificing permeability in the final foam product.

A related object of the present invention is to provide a method for preparing a polyester urethane foam that is relatively easy to control.

Yet another object of the present invention is to provide a polyether urethane foam which possesses a high degree of permeability over a relatively wide range of densities.

These and other advantages of the present invention, as well as additional inventive features, will be apparent from the description of the invention provided herein.

SUMMARY OF THE INVENTION

The present invention is predicated on the discovery that flexible, highly permeable, urethane foams can be prepared by incorporating particular amounts of an epoxidized soybean oil into a reactive composition which comprises at least one isocyanate and, as the only polyol component, either at least one polyester polyol or at least one polyether polyol.

More specifically, it was discovered that, when that oil was added in particular amounts into a composition comprising at least one isocyanate and, as the only polyol component, at least one polyester polyol, increased stability in the foam composition during preparation of the foam is realized (making the foam-producing process easier to control). Moreover, and surprisingly, the aforesaid increased stability was obtained without unduly sacrificing the permeability of the foam product.

When the oil was added to a composition comprising at least one isocyanate and, as the only polyol component, at least one polyether polyol, it was unexpectedly discovered that an increase in cell-opening (i.e., air permeability) was obtained, as compared to that same composition which contained none of the oil.

In summary, the present invention provides a pre-formation method for the preparation of polyester and highly permeable polyether urethane foams using either only saturated polyester polyols or only saturated polyether polyols, respectively. Methods for providing either of these foams were not previously known to exist. The preparation of polyether and polyester urethane foams by pre-formation methods using only such polyether polyols or polyester polyols, respectively, was not previously known.

One aspect of the present invention provides a pre-formation method for the preparation of a flexible, open-celled polyester urethane foam. The method comprises reacting at least one isocyanate and at least one polyol in the presence of at least one catalyst and about 7 phR (parts by weight per 100 parts by weight of the total amount of polyol present in the reaction composition) to about 25 phR of an epoxidized soybean oil, wherein each polyol is a saturated polyester polyol.

Another aspect of the present invention provides a pre-formation method for the preparation of a flexible, highly-permeable, open-celled, polyether urethane foam. This method comprises reacting at least one isocyanate and at least one polyol in the presence of at least one catalyst and an epoxidized soybean oil, wherein each polyol is a saturated polyether polyol.

A further aspect of the present invention provides flexible, open-celled, urethane foams prepared by the methods of the present invention.

DESCRIPTION OF THE PREFERRED EMBODIMENTS

One aspect of the present invention provides a method for the preparation of a flexible, open-celled, polyester urethane foam. This method comprises reacting at least one isocyanate and at least one polyol in the presence of at least one catalyst and about 7 phR to about 25 phR of an epoxidized soybean oil (e.g., Nuoplaz 849, Huls Chemical Co.), wherein each polyol is a saturated polyester polyol. Advantageously, when preparing this polyester foam, the oil is present in an amount ranging from about 10 to about 15 phR.

When less than 7 phR of the oil was added, it was found that the oil destabilized the composition such that a foam was not able to be formed. Surprisingly, however, when the oil was added at a level of at least 7 phR, stabilization of the composition was achieved, and a foam product was able to be obtained. Moreover, the resulting foam possessed an acceptable level of permeability. The addition of oil in excess of about 25 phR to this composition will not destabilize the composition, but is undesirable only because it has either no or only a minimal effect on the permeability and stability of the composition.

A composition is stable, for purposes of the present invention, when there is an absence of settling, splitting, collapsing and boiling during the execution of the inventive method. Settling, splitting and collapsing typically occur as the foam composition nears or reaches its gel point. Boiling occurs during the execution of the method when the gases escape events from the composition instead of remaining therein and causing the foam to rise.

Another aspect of the present invention provides a method for preparing a flexible, highly-permeable, open-celled, polyether urethane foam. This method comprises reacting at least one isocyanate and at least one polyol in the presence of at least one catalyst and an epoxidized soybean oil, wherein each polyol is a saturated polyether polyol. When the oil was added to this particular composition, even in amounts as low as about 1 phR, an increase in cell-opening was obtained (as compared to the same composition to which no oil had been added). Advantageously, the oil may be added in those compositions up to about 15 phR, and preferably from about 5 phR to about 15 phR, in order to provide a polyether urethane foam with sufficient permeability to be used, e.g., as a filter medium. The amount of oil may be increased above about 15 phR if desired, however, addition at this level was found to provide no significant beneficial effect on the degree of cell-opening in the composition and/or permeability in the resulting foam.

It has been determined that, with respect to both aspects of the present invention, that the oil functions in the aforesaid manner without reacting with any of the other components of the composition.

Levels of permeability which would typically be desirable in flexible, permeable, polyester urethane foams intended for general use begin at about 1–2 ft$^3$/min, advantageously range above about 2–4 ft$^3$/min, and preferably range above about 8 ft$^3$/min when it is desired to use the foam as a filter medium. Permeability that is typically desirable in flexible, permeable, polyether urethane foams intended for general use begin at about 1–2 ft$^3$/min, advantageously range above about 3–5 ft$^3$/min, and preferably range above about 7–8 ft$^3$/min. These permeabilities are determined using ASTM D3574–91.

All of the compositions used in the methods of the present invention require the inclusion of at least one isocyanate as a reactive component. The isocyanate may be of any conventional isocyanate material used in the art of urethane foam production, including isocyanate "pre-polymers." All such materials are well known to those of ordinary skill and, further, their proper selection for purposes of the present invention is also well within the skill of the ordinary practitioner. Examples of such isocyanates that are suitable for use in the methods of the present invention include phenylene diisocyanate, naphthalene diisocyanate, diphenyl-4,4-diisocyanate, xylylene diisocyanate, and polymeric methylene diphenylene isocyanate (MDI). Advantageously, toluene diisocyanate (TDI) may be employed, preferably as one of the conventional mixtures of its 2,4- and 2,6-isomers. Such mixtures may advantageously contain from about 65% to about 80% of the 2,4-isomer, and most preferably about 80% of that isomer.

The amount of polyisocyanate normally present (the isocyanate "index") in the composition will generally range from about 90% to about 120%, and preferably about 105% to about 115%, of the amount required to react stoichiometrically with the other reactive components in the composition, i.e., primarily the polyols and water. In terms of absolute quantities, when 80/20-TDI is used as the isocyanate component, the absolute quantity of that component in the composition may range from about 35 phR to about 65 phR.

Each of the compositions used in the inventive methods further require as a second reactive component either at least one saturated polyester polyol or at least one saturated polyether polyol. The use of saturated polyols contributes significantly to the flexibility desired in the final foam product. Urethanes prepared using unsaturated polyols are generally known by those in the art to be relatively stiff and inflexible and are not used to prepare flexible foams.

The saturated polyester polyol component may include one or more of any of those polyols known to those skilled in the art. Conventional saturated polyester polyols normally have an average molecular weight of about 800 to 3,000, with the hydroxyl number ranging from about 35 to about 150. Generally preferred are saturated polyester polyols having an average molecular weight of about 1,700 to about 3,000 and an average hydroxyl functionality of between about 2 and 3. Such polyols can be obtained from various commercial sources, or by, e.g., esterifying polycarboxylic acids with polyhydric alcohols. Most preferred are commercial products prepared using adipic acid, diethylene glycol and a small percentage of glycerine. F-53t a diethylene glycol adipate (Witco Chemical), is an example of the most preferred type of saturated polyester polyol.

The saturated polyether polyol component used in the present invention is also conventional in the art. Such polyols normally have a molecular weight of about 2,000 to about 6,500, and preferably from about 2,700 to about 3,900, with a hydroxyl functionality of about 2 to about 8, preferably between about 2 and 3. Suitable polyether polyols may be prepared by the addition of an excess of alkylene oxides, eog., propylene oxide and/or ethylene oxide, to, e.g., glycerine, trimethylolpropane, pentaerythritol, alphamethylglucoside, sorbitol or sucrose. The use of 15082 (Dow Chemical), a blend of three polyethers, or HS 100 (Arco Chemical), alkyl modified polyether polyols, are examples of the preferred types of saturated polyether polyols.

In order to prepare a foam in accordance with any of the foregoing methods of the present invention, at least one catalyst is advantageously present in the foam-forming composition. The catalyst functions to control the reaction rates of polyol and water with the isocyanate. While organometallic compounds are generally utilized as catalysts, organic tin catalysts are advantageously used because they provide an optional balance in activity and, further, are relatively non-toxic as compared to other potential catalysts. Examples of such catalysts include salts of carboxylic acids such as tin (II) acetate, tin (II) octoate, tin (II) ethylhexoate, and tin (II) laurate, and dialkyl tin salts such as dibutyl tin maleate, dibutyl tin diacetate, dibutyl tin dilaurate, and dioctyl tin diacetate. The preferred organometallic catalyst for the preparation of the open-celled urethane foam is dibutyl tin dilaurate (UL-5, Witco Chemical Corp.) for the polyester foam, and tin (II) octoate (S-50, Cosan Chemical Co.) for the polyether foam.

The catalysts are normally added in an amount that is sufficient to catalyze the foam-forming reaction. In the case of polyester foams of the present invention, this amount advantageously ranges up to about 1 phR, and preferably from about 0.1 phR to about 0.5 phR. For polyether foams, this amount advantageously ranges from about 0.1 phR to about 2.0 phR, and preferably from about 0.1 phR to about 1 phR.

At least one amine co-catalyst may also be included in the reactive compositions used in the inventive methods. Such amines are advantageously tertiary aliphatic amines, which include, e.g., triethylenediamine, N-ethylmorpholine, N,N,N,N-tetramethyl-1,3-butanediamine, bis 2-(N,N-dimethylamino) ethyl ether, diethylenetriamine, and oxybis(N,N-diethanolamine). Preferred amine co-catalysts for the preparation of either a polyester or polyether urethane foam in accordance with the inventive method include triethylenediamine (Dabco 33LV, Air Products & Chemicals, Inc.), a blend of bis(2-dimethylaminoethyl) ether, and triethylene diamine (C-232, Air Products and Chemicals).

As was the case for the organometallic catalysts, the aforementioned amine catalysts are normally added in an amount sufficient to catalyze the foam-forming reaction. In the case of polyester foams, this amount advantageously ranges from about 0.1 phR to about 3.0 phR, and preferably from about 0.5 phR to about 2.0 phR. For polyether foam, this amount advantageously ranges from about 0.1 phR to about 1.0 phR, and preferably from about 0.1 phR to about 0.5 phR.

At least one conventional urethane foam emulsifier (also referred to as a stabilizer) may also be used in the reaction composition. Such emulsifiers function to stabilize the rising foam composition. In other words, the emulsifier stabilizes the composition up until the time it solidifies and forms a gel (a gel is formed when the foam completes its rise and reaches its maximum height). Useful emulsifiers include those well-known in the art, e.g., silicone-based copolymers. Preferred emulsifiers for the preparation of polyether foams include polyalkylene oxide dimethyl siloxane copolymers (L-620, OSI Chemicals) and L-560 (OSI Chemicals). While the use of L-550 (OSI Chemicals) is preferred in the case of polyester foams, either type of emulsifier may be successfully used in the inventive methods of preparing polyester foams.

When using epoxidized soybean oil in accordance with the method of the present invention, it was found that significantly less emulsifier is required in the compositions when compared to known pre-formation methods of preparing urethane foams, e.g., the process for preparing the Velve® foam. Thus, in addition to the other advantages discussed previously, the addition of oil in accordance with the inventive method allows the amount of emulsifier in the compositions to be decreased (e.g., from at least about 4 phR in the Velve® foam method to about 1–2 phR in the present method). Despite this decrease in the amount of emulsifier present, the stability of the foam (in the case of polyester foams) is surprisingly not adversely affected. When preparing polyester foams in accordance with the inventive method, about 1 phR to about 4 phR of an emulsifier is used. Polyether foams advantageously use about 0.5 phR to about 2 phR of emulsifier.

At least one conventional blowing agent may also be included in the compositions used in the inventive methods. These agents are included in order to generate a gas which converts the polymer formed from the reactive components in the compositions into a foam. Water is the primary blowing agent used, but it can be supplemented with volatile organic blowing agents. The blowing agent will advantageously comprise water in an amount ranging from about 2 phR to about 6 phR, and preferably from about 3 phR to about 5 phR.

Numerous other ingredients may be added to any composition used in connection with a method of the present invention. Such ingredients include, by way of example only, discoloration and aging inhibitors, flame retardants, pigments, plasticizers, and colorants.

A further aspect of the present invention includes flexible, open-celled, urethane foams that are prepared in accordance with the methods of the present invention, as previously described. Such foams are useful as air filters.

The production of foams in accordance with the methods of the present invention can be achieved by the use of conventional urethane foam-producing machinery, operated in a manner known to those skilled in the art. More particularly, the foams can be made by either casting or molding. In the former, the components from which the foam is prepared are mixed together and deposited onto a moving conveyor in a conventional manner. While on the conveyor, the composition forms a foam mass which rises until it reaches its maximum height (its gel point). After the foam cures, it may be cut or otherwise processed in order to obtain foam pieces of a desired size.

The following examples further illustrate the present invention but, of course, should not be construed as in any way limiting its scope.

In the examples, cream time is the time interval from the pouring of the composition from which the foam is formed onto a substrate until that composition turns creamy or cloudy. Rise time is the interval from the pouring of the composition onto a substrate until completion of expansion of the expanding foam mass (which comprises the reaction product of the foam-forming composition). Complete expansion is characterized by cessation of expansion of the foam mass, the solidification of the foam mass (into a gel), and/or the noticeable evolution of gas bubbles on the surface of the foam. Permeability, measured in cubic feet of air per minute, is determined using Test G of ASTM Method D 3574-91. The quantity of components set forth in the tables are provided in units of phR.

Each example, and further each run set forth therein, prepares a foam using the same machinery and processing techniques. Such processing methods are well-known in the art. The only change from example to example, and indeed from run to run, is the change in the components of the foam-forming composition.

COMPARATIVE EXAMPLE

Preparation of Velve® foam

This example illustrates the components used to prepare, and properties of, a conventional porous urethane foam. The foam is prepared from a composition comprising a mixture of polyether and polyester polyols using conventional pre-formation methods. This foam possesses a relatively high level of permeability.

TABLE A

| Component | 1 | 2 |
| --- | --- | --- |
| F-76[1] | 80 | 85 |
| PL-637[2] | — | 15 |
| 3512[3] | 20 | — |
| TDI 80/20[4] | 57.2 | 54.6 |
| Index[5] | 110 | 110 |
| S-50[6] | 0.15 | 0.15 |
| C-232[7] | 0.15 | 0.24 |
| L-560[8] | 4.0 | 4.3 |
| JW-50[9] | 0.05 | 0.08 |
| $H_2O$ | 4.4 | 4.0 |
| Yellow Dye | 1.3 | — |
| Cream time (sec) | 8 | 8 |
| Rise time (sec) | 110 | 120 |
| Results[10] | Foam | Foam |
| Air permeability (ft$^3$/min) | 6.0 | 8.0 |
| Density (lb/ft$^3$) | 1.70 | 1.50 |

[1] F-76 (Foamrez F-76, Witco Chemical Corp.) is a diethylene glycol adipate polyester (with glycerine) having a hydroxyl number of about 59.
[2] PL-637 (Pluracol PL-637, BASF Corp.) is a polyether polyol containing grafted polystyrene and acrylonitrile and homopolymers of styrene acrylonitrile.
[3] 3512 is a polyalkylene oxide polyether available from Dow Chemical.
[4] TDI 80/20 is a mixture of 80% of the 2,4-isomer and 20% of the 2,6-isomer of toluene diisocyanate.
[5] Index is a measure of the amount of isocyanate present, i.e., the amount of isocyanate required to react stoichiometrically with the reactive components in the reactive mixture.
[6] S-50 (Cosan Chemical Co.) is a tin catalyst comprising 50% stannous octoate in a phthalate plasticizer.
[7] C-232 (Air Products & Chemicals) is a tertiary amine catalyst comprising a blend of parts bis (2-dimethyl aminoethyl) ether 70% in dipropylene glycol part diethylene-triamine 33% in propylene glycol 67%.
[8] L-560 (OSI Chemical) is a silicone surfactant (emulsifier).
[9] JW-50 (sold as DC-200 by Dow Corning) is a destabilizing silicone ingredient comprising a polydimethyl siloxane.
[10] Results indicate whether a foam was prepared or the expanding foam mass collapsed.

EXAMPLE 1

Preparation of a Polyether Urethane Foam

This example illustrates the components used to prepare, and properties of, a polyether urethane foam using the pre-formation method of the present invention. The results demonstrate the role of epoxidized soybean oil as a safe and effective cell-opening agent when used in compositions for preparing polyether foams.

TABLE B

| Component | 1 | 2 | 3 | 4 | 5 | 6 | 7 | 8 |
| --- | --- | --- | --- | --- | --- | --- | --- | --- |
| 15082[1] | 100 | 100 | 100 | 100 | 100 | 20 | 20 | 20 |
| HS100[2] | — | — | — | — | — | 80 | 80 | 80 |
| TDI 80/20 | 59 | 59 | 59 | 59 | 59 | 38 | 38 | 38 |
| Index | 113 | 113 | 113 | 113 | 113 | 115 | 115 | 115 |

TABLE B-continued

| Component | 1 | 2 | 3 | 4 | 5 | 6 | 7 | 8 |
|---|---|---|---|---|---|---|---|---|
| Nuoplaz 849[3] | — | 1 | 3 | 5 | 10 | — | 5 | 10 |
| S-50 | 0.5 | 0.5 | 0.5 | 0.5 | 0.5 | 0.36 | 0.36 | 0.36 |
| C-232 | 0.2 | 0.2 | 0.2 | 0.2 | 0.2 | 0.1 | 0.25 | 0.1 |
| L-620[4] | 0.8 | 0.8 | 0.8 | 0.8 | 0.8 | 1.0 | 1.0 | 1.0 |
| $H_2O$ | 4.6 | 4.6 | 4.6 | 4.6 | 4.6 | 2.9 | 2.9 | 2.9 |
| Cream time (sec) | 9 | 8 | 8 | 8 | 9 | 8 | 6 | 8 |
| Rise time (sec) | 65 | 60 | 60 | 67 | 90 | 120 | 90 | 150 |
| Results | Foam | Foam | Foam | Foam | Foam | Foam | Foam | Foam |
| Air permeability ($ft^3$/min) | .93 | 1.16 | 2.04 | 3.47 | 4.93 | 0.01 | 2.11 | N/A[5] |
| Density (lb./$ft^3$) | 1.40 | 1.31 | 1.40 | 1.41 | 1.59 | 1.97 | 2.00 | N/A |

[1]15082 (Dow Chemical) is a blend of three polyethers.
[2]HS100 (ARCO Chemical) is an alkyl modified polyether polyol.
[3]Nuoplaz 849 (Huls Chemical Co.) is an epoxidized soybean oil.
[4]L-620 (OSI Chemicals) is polyalkylene oxide dimethyl siloxane copolymers.
[5]N/A: property not measured.

The urethane foam prepared using the epoxidized soybean oil in combination with only polyether polyols provided a stable foam product having improved air permeability, and a general increase in foam density, as compared to the same composition without the oil.

EXAMPLE 2

Preparation of a Polyester Urethane Foam

This example illustrates the components used to prepare, and properties of, a polyester urethane foam using the pre-formation method of the present invention. The results demonstrate the role of epoxidized soybean oil as both a stabilizer and cell-opener in compositions used to prepare polyester foams.

TABLE C

| Component | 1 | 2 | 3 | 4 | 5 | 6 | 7 |
|---|---|---|---|---|---|---|---|
| F-53[1] | 100 | 100 | 100 | 100 | 100 | 100 | 100 |
| Nuoplaz 849 | 2.5 | 5 | 7.5 | 10 | 15 | 15 | 15 |
| TDI 80/20 | 43 | 43 | 43 | 43 | 43 | 43 | 43 |
| Index | 102 | 102 | 102 | 102 | 102 | 102 | 102 |
| L-550[2] | 4 | 4 | 4 | 4 | 4 | 1 | 3 |
| 33LV[3] | 0.6 | 0.6 | 0.6 | 0.6 | 0.6 | 0.6 | 0.6 |
| $H_2O$ | 3.4 | 3.4 | 3.4 | 3.4 | 3.4 | 3.4 | 3.4 |
| Yellow Dye | 1.3 | 1.3 | 1.3 | 1.3 | 1.3 | 1.3 | 1.3 |
| UL-5[4] | 0.4 | 0.4 | 0.4 | 0.4 | 0.4 | 0.4 | 0.4 |
| Cream time (sec) | 7 | 7 | 7 | 7 | 7 | 7 | 7 |
| Rise time (sec) | — | — | 75 | 60 | 60 | 60 | 60 |
| Results | Collapse | Collapse | Foam | Foam | Foam | Foam | Foam |
| Air permeability ($ft^3$/min) | — | — | >9 | >9 | 8.55 | 7.62 | 8.56 |
| Density (lb./$ft^3$) | — | — | 1.92 | 1.80 | 1.99 | 1.92 | 1.86 |

[1]F-53 (Foamrez F-53, Witco Chemical Corp.) is a polyester polyol.
[2]L-550 (OSI Chemicals) is polyalkylene oxide dimethyl siloxane copolymers.
[3]33LV (Dabco 33LV, Air Products and Chemicals, Inc.) is triethylene diamine (33%) in dipropylene glycol.
[4]UL-5 (Witco Chemical Corp.) is dibutyl tin dilaurate (50%) in di(2-ethylhexylphthalate) (50%).

The urethane foam prepared using the epoxidized soybean oil in combination with a composition containing only polyester polyols provided a stable foam only when a particular amount of that oil was added. All of the foams prepared using the oil above that minimum level possesses exceptional air permeability and good density.

EXAMPLE 3

Comparison of Epoxidized Soybean Oil with DOP and Messamol Oil

This example illustrates the differences observed when preparing a polyester urethane foam in accordance with the method of the present invention (using epoxidized soybean oil) and when DOP, messamol oil, and non-epoxidized soybean oil are substituted for the epoxidized soybean oil in that method.

TABLE D

| Component | 1 | 2 | 3 | 4 |
|---|---|---|---|---|
| F-53 | 100 | 100 | 100 | 100 |

TABLE D-continued

| Component | 1 | 2 | 3 | 4 |
|---|---|---|---|---|
| Nuoplaz 849 | 15 | — | — | — |
| DOP[1] | — | 15 | — | — |
| Messamol Oil[2] | — | — | 15 | — |
| Soybean Oil[3] | — | — | — | 15 |
| TDI 80/20 | 46 | 46 | 46 | 46 |
| Index | 110 | 110 | 110 | 110 |
| L-550 | 2 | 2 | 2 | 2 |
| 33LV | 0.6 | 0.6 | 0.6 | 0.6 |
| H$_2$O | 3.4 | 3.4 | 3.4 | 3.4 |
| Yellow Dye | 1.3 | 1.3 | 1.3 | 1.3 |
| UL-5 | 0.4 | 0.4 | 0.4 | 0.4 |
| Cream time (sec) | 7 | 8 | 8 | 8 |
| Rise time (sec) | 60 | — | — | — |
| Results | Foam | Collapse | Collapse | Collapse |
| Air permeability (ft$^3$/min) | 8.93 | — | — | — |
| Density (lb./ft$^3$) | 1.86 | — | — | — |

[1]DOP (BASF) is dioctyl phthalate.
[2]Messamol Oil (Miles) is an alkyl sulfonic acid ester of phenol.
[3]Wesson ® Cooking Oil.

This example demonstrates that other types of additives do not provide the same advantages as epoxidized soybean oil in respect to the preparation of a polyester urethane foam.

All of the references cited herein are hereby incorporated in their entireties by reference.

While this invention has been described with an emphasis upon preferred embodiments, it will be obvious to those of ordinary skill in the art that variations of the preferred methods may be used and that it is intended that the invention may be practiced otherwise than as specifically described herein. Accordingly, this invention includes all modifications encompassed within the spirit and scope of the invention as defined by the following claims.

What is claimed is:

1. A method for preparing a flexible, open-celled, polyurethane foam comprising reacting at least one isocyanate and at least one saturated polyester polyol in a reaction mixture in the presence of at least one catalyst and about 7 phR to about 25 phR of an epoxidized soybean oil, wherein said reaction mixture is essentially free of polyether polyols, wherein said foam has a permeability of at least 1 ft$^3$/min.

2. The method according to claim 1, wherein the epoxidized soybean oil is present in an amount ranging from about 10 to about 15 phR.

3. The method according to claim 1, the method further comprising reacting the isocyanate and polyol in the presence of at least one emulsifier.

4. The method according to claim 3, wherein the catalyst is a mixture of at least one tin catalyst and at least one amine catalyst.

5. The method according to claim 3, wherein the emulsifier is present in an amount ranging from about 1 phR to about 4 phR, the tin catalyst is present in an amount ranging from about 0.1 phR to about 0.5 phR, and the amine catalyst is present in an amount ranging from about 0.5 phR to about 2.0 phR.

6. The method according to claim 5, wherein the epoxidized soybean oil is present in an amount ranging from about 10 to about 15 phR.

7. A method for preparing a flexible, open-celled, polyurethane foam comprising reacting at least one isocyanate and at least one saturated polyether polyol in a reaction mixture in the presence of at least one catalyst and an epoxidized soybean oil wherein said reaction mixture is essentially free of polyester polyols, wherein said foam has a permeability of at least 1 ft$^3$/min.

8. The method according to claim 7, wherein the epoxidized soybean oil is present in an amount ranging up to about 15 phR.

9. The method according to claim 8, wherein the epoxidized soybean oil is present in an amount ranging from about 5 phR to about 15 phR.

10. The method according to claim 7, the method further comprising reacting the isocyanate and polyol in the presence of at least one emulsifier.

11. The method according to claim 10, wherein the catalyst is a mixture of at least one tin catalyst and at least one amine catalyst.

12. The method according to claim 10, wherein the emulsifier is present in an amount ranging from about 0.5 phR to about 2 phR, the tin catalyst is present in an amount ranging from about 0.1 phR to about 1 phR, and the amine catalyst is present in an amount ranging from about 0.1 phR to about 0.5 phR.

13. The method according to claim 11, wherein the epoxidized soybean oil is present in an amount ranging from about 5 to about 15 phR.

14. A flexible, open-celled, polyurethane foam prepared by reacting a mixture comprising at least one isocyanate and at least one saturated polyester polyol in the presence of at least one catalyst and about 7 phr to about 25 phr of an epoxidized soybean oil, wherein the permeability of said foam is at least 1 ft$^3$/min.

15. The flexible foam according to claim 14, wherein the epoxidized soybean oil is present in an amount ranging from about 10 to about 15 phR.

16. The flexible foam according to claim 14, the method further comprising reacting the isocyanate and polyol in the presence of at least one emulsifier.

17. The flexible foam according to claim 16, wherein the catalyst is a mixture of at least one tin catalyst and at least one amine catalyst.

18. The flexible foam according to claim 17, wherein the emulsifier is present in an amount ranging from about 1 phR to about 4 phR, the tin catalyst is present in an amount ranging from about 0.1 phR to about 0.5 phR, the amine catalyst is present in an amount ranging from about 0.5 phR to about 2.0 phR, and the epoxidized soybean oil is present in an amount ranging from about 10 to about 15 phR.

19. A flexible, open-celled, polyurethane foam prepared by reacting a mixture comprising an isocyanate and at least one saturated polyether polyol in the presence of at least one catalyst and an epoxidized soybean oil, wherein the permeability of said foam is at least 1 ft$^3$/min.

20. The flexible foam according to claim 19, wherein the epoxidized soybean oil is present in an amount ranging up to about 15 phR.

21. The flexible foam according to claim 20, wherein the epoxidized soybean oil is present in an amount ranging from about 5 phR to about 15 phR.

22. The flexible foam according to claim 19, the method further comprising reacting the isocyanate and polyol in the presence of at least one emulsifier.

23. The flexible foam according to claim 22, wherein the catalyst is a mixture of at least one tin catalyst and at least one amine catalyst.

24. The flexible foam according to claim 23, wherein the emulsifier is present in an amount ranging from about 0.5 phR to about 2 phR, the tin catalyst is present in an amount ranging from about 0.1 phR to about 1 phR, and the amine catalyst is present in an amount ranging from about 0.1 phR to about 0.5 phR.

25. The flexible foam according to claim 24, wherein the epoxidized soybean oil is present in an amount ranging from about 5 to about 15 phR.

26. The method according to claim 1, wherein said mixture is free of polyether polyols.

27. The method according to claim 1, wherein the permeability of said foam is from 1–2 ft$^3$/min.

28. The method according to claim 27, wherein the permeability of said foam is above about 2 ft$^3$/min.

29. The method according to claim 28, wherein the permeability of said foam is above about 8 ft$^3$/min.

30. The method according to claim 7, wherein said mixture is free of polyester polyols.

31. The method according to claim 7, wherein the permeability of said foam is from 1–2 ft$^3$/min.

32. The method according to claim 31, wherein the permeability of said foam is above about 3 ft$^3$/min.

33. The method according to claim 32, wherein the permeability of said foam is above about 8 ft$^3$/min.

34. The flexible foam according to claim 14, wherein said mixture is essentially free of polyether polyols.

35. The flexible foam according to claim 34, wherein said mixture is free of polyether polyols.

36. The flexible foam according to claim 14, wherein the permeability of said foam is from 1–2 ft$^3$/min.

37. The flexible foam according to claim 36, wherein the permeability of said foam is above about 2 ft$^3$/min.

38. The flexible foam according to claim 32, wherein the permeability of said foam is above about 8 ft$^3$/min.

39. The flexible foam according to claim 19, wherein said mixture is essentially free of polyester polyols.

40. The flexible foam according to claim 39, wherein said mixture is free of polyester polyols.

41. The flexible foam according to claim 19, wherein the permeability of said foam is from 1–2 ft$^3$/min.

42. The flexible foam according to claim 41, wherein the permeability of said foam is above about 3 ft$^3$/min.

43. The flexible foam according to claim 42, wherein the permeability of said foam is above about 8 ft$^3$/min.

* * * * *